United States Patent [19]

Matzner et al.

[11] Patent Number: 5,375,154
[45] Date of Patent: Dec. 20, 1994

[54] REDUCED PRESSURE DROP SPACER FOR BOILING WATER REACTOR FUEL BUNDLES

[75] Inventors: Bruce Matzner; Gerald M. Latter, both of San Jose, Calif.

[73] Assignee: General Electric Company, San Jose, Calif.

[21] Appl. No.: 46,290

[22] Filed: Apr. 15, 1993

[51] Int. Cl.[5] ................................................ G21C 3/34
[52] U.S. Cl. .................................. 376/441; 376/438; 376/462
[58] Field of Search ............... 376/438, 439, 462, 434, 376/448, 446, 441, 442; 976/DIG. 79

[56] References Cited

U.S. PATENT DOCUMENTS

| | | | |
|---|---|---|---|
| 3,352,758 | 11/1967 | Anthony | 376/438 |
| 3,607,642 | 9/1971 | Murdock | 376/439 |
| 3,833,471 | 9/1974 | Chetter | 376/442 |
| 4,056,441 | 11/1977 | Marmonier et al. | 376/438 |
| 4,152,205 | 5/1979 | Kropfl | 376/441 |
| 4,220,199 | 9/1980 | Romanos | 165/134 R |
| 4,416,852 | 11/1983 | Nylund | 376/438 |
| 4,508,679 | 4/1985 | Matzner et al. | 376/444 |
| 4,827,063 | 5/1989 | Bokers et al. | 376/439 |
| 5,130,083 | 7/1992 | Johansson | 376/441 |

*Primary Examiner*—Donald P. Walsh
*Assistant Examiner*—Meena Chelliah
*Attorney, Agent, or Firm*—J. E. McGinness

[57] ABSTRACT

A spacer array is disclosed in which alternating cells are disposed at differing elevations. In a preferred octagonal spacer cell array, alternate fuel rods within the rows and columns of the fuel bundle matrix are surrounded by octagonal spacer cells at a first elevation. Likewise, and in the same preferred octagonal spacer array, the remaining alternate fuel rods within the rows and columns of the fuel bundle matrix are surrounded by octagonal spacer cells at a second elevation. The octagonal spacer cells of the spacer array at one level adjoin the octagonal spacer cells of the spacer array at an adjacent level. Specifically, each octagonal spacer cell has the top and/or the bottom of as many as four of its eight sides disposed for joining with one side of as many as four octagonal cells in an adjacent cell layer. Each cell has approximately 0.6 of an inch height, or one-half the 1.2 inch height of the prior art. Physically each cell would have approximately half the height of the prior art cell type spacers. There results a spacer cell array which distributes half of the pressure drop at a first elevation, and the remaining half of the pressure at a second elevation for a projected spacer area of one-half that area of the prior art. Further, and because the two cell arrays making up the spacer are disposed at differing elevations—immediately above and below each other—the produced flow resistance at one level of the spacer cells does not have horizontally immediately adjacent cells. Thus, the cells in one layer do not co-act with adjacent flow frictions to the same extent as the co-action would occur if all flow frictions and restrictions were at the same elevation. There results an improved and lesser pressure drop in the disclosed spacer array.

8 Claims, 3 Drawing Sheets

REDUCED PRESSURE DROP SPACER FOR BOILING WATER REACTOR FUEL BUNDLES

This invention relates to fuel spacers utilized in boiling water nuclear reactor fuel bundles. More particularly, a spacer construction is illustrated wherein the cells utilized in each single spacer alternate in upper and lower layers about the fuel rods of a fuel bundle. This spacer construction is used to reduce coolant pressure drop within the fuel bundle, particularly in the vicinity of the spacer.

BACKGROUND OF THE INVENTION

Fuel bundles for boiling water nuclear reactors can be generally summarized as to their construction. They include a lower tie plate, an upper tie plate and a plurality of vertically upstanding fuel rods there between. Insofar as is relevant to this invention, a fuel bundle channel surrounds the lower tie plate, extends around the fuel rods to the upper tie plate, and forms a confined fluid flow path unique to each fuel bundle. This flow path between the tie plates is essentially isolated from both other fuel bundles and the surrounding core bypass region about the fuel bundles.

The lower tie plate supports the fuel rods and permits the entry of water for both the generation of steam and moderation of fast moving electrons from the nuclear reaction in the fuel rods to slower moving electrons to continue the nuclear reaction. The upper tie plate allows the escape of water and generated steam. It is from the escaped steam that power is ultimately generated, this generation occurring typically in a turbine that is remote from the reactor.

The fuel rods within the fuel bundle are long and slender—typically being in the range of 160 inches in length. These fuel rods are all placed within a square matrix 5¼ inches on a side (dimension is approximate). The modern tendency to enable both improved nuclear performance and steam generation efficiency has been to place increasing numbers of discrete fuel rods into the same 5¼ inch square section. Currently densities of fuel rods are known that include 8 by 8, 9 by 9, and 10 by 10, matrices of fuel rods. With the dense fuel bundle arrays, the individual fuel rods become smaller of diameter and the fuel rods become more flexible between the upper and lower tie plate.

Water and steam fluid flow through the fuel bundles causes the long slender fuel rods to become subject to vibration. Without restraint, the fuel bundles could come into abrading contact and lose their required sealing of their contained nuclear fuel. Further, when the fuel rods move out of alignment, they lose designed nuclear efficiency which is realized when the rods maintain precise designed side-by-side spacing. Accordingly, it has long been the accepted practice of the nuclear industry to incorporate so-called fuel rod spacers at varied elevations within the fuel bundles.

The prior art construction of fuel bundle spacers is relatively easy to understand. A spacer intimately surrounds each and every fuel rod at the particular elevation of the spacer. Thus, each spacer at its own elevation causes each fuel rod to be braced into its designed placement relative to the remaining fuel rods. Various schemes are utilized. These schemes include so-called cell spacers in which individual cells surround each fuel rod at the elevation of the spacer to maintain the surrounded fuel rod in its designed orientation. The cells have been round, or as disclosed in the preferred embodiment here, octagonal.

These fuel rod spacers are the sites of pressure loss within the fuel bundle. In order to understand this effect, it is first necessary to understand that water is pumped through the fuel bundles. Thereafter, the problem of the more dense fuel bundle arrays in causing pressure drop at the location of the spacers can be understood.

In fuel bundles, water moderator is generally pumped into the fuel bundles entering through the lower tie plate and exiting upward through the upper tie plate. As water moves through the fuel bundle, the pressure drop of the water in its passage through the fuel bundle becomes important. In so far as is relevant here, pressure drop has an impact on not only the overall power output of the reactor, but additionally impacts the stability of the reactor at certain power and flow rates. By way of specific example, excessive pressure drop in the upper two phase (steam/water) region of the fuel bundle is avoided to prevent certain thermal-hydraulic and nuclear-thermal-hydraulic instabilities that arise at certain moderator flow and power rates of the reactor. In short, there is a continuing effort on the part of nuclear designers to maintain low pressure drop within the fuel bundles of the reactor.

Having explained in general terms the problems of pressure drop within the upward pumped moderator flow within each fuel bundle, the aggravation of pressure drop by new and dense arrays of fuel rods can now be understood.

In the relatively dense and new fuel arrays, spacers constitute areas of flow constriction within the fuel bundle. This effect can be understood by considering the effects of surface friction on the passing moderator as well as the restriction of the available flow area that a spacer represents.

When a fuel bundle has additional fuel rods introduced within the matrix of the array, the surface area of the fuel rods over which flow must occur increases. This increase in surface area is aggravated at each spacer. Remembering that the each fuel rod is discretely surrounded by the material of the spacer at the elevation of the spacer, two additional surfaces are added at the elevation of the spacer to produce fluid friction.

In addition to the friction that the passing fluid encounters from the surface of the fuel rod, the surfaces of the spacer add their own friction. Specifically, the surface of the spacer exposed towards the fuel rod adds flow friction. Likewise, the surface of the spacer exposed away from the fuel rod adds flow friction. These respective surfaces will contribute to flow friction and thus pressure drop approximately proportional to the length of the spacer cells involved.

Further, the total flow area around the fuel rods will be lessened by the dimension of the spacer. This dimension of the spacer adds flow friction roughly proportional to the square of the spacers cross sectional projected area. Due to the cell placement, this spacer construction internally will have one-half the projected area of the prior art type cell spacer.

Moreover, all these flow friction factors come together and act together at the same elevation within the fuel bundle. That elevation is the elevation of the spacer. Thus, it can be understood that the pressure drop produced at the spacers is an important factor in the overall pressure drop of the fuel bundles and the reactor.

Having set forth the pressure drop problem of spacers, the spacer invention of this disclosure can now be described.

SUMMARY OF THE INVENTION

A spacer array is disclosed in which alternating cells are disposed at differing elevations. In a preferred octagonal spacer cell array, alternate fuel rods within the rows and columns of the fuel bundle matrix are surrounded by octagonal spacer cells at a first elevation. Likewise, and in the same preferred octagonal spacer array, the remaining alternate fuel rods within the rows and columns of the fuel bundle matrix are surrounded by octagonal spacer cells at a second elevation. The octagonal spacer cells of the spacer array at one level adjoin the octagonal spacer cells of the spacer array at an adjacent level. Specifically, each octagonal spacer cell has the top and/or the bottom of as many as four of its eight sides disposed for joining with one side of as many as four octagonal cells in an adjacent cell layer. Each cell has approximately 0.6 of an inch height, or one-half the 1.2 inch height of the prior art. Physically each cell would have approximately half the height of the prior art cell type spacers. There results a spacer cell array which distributes half of the pressure drop at a first elevation, and the remaining half of the pressure at a second elevation for a projected spacer area of one-half that area of the prior art. Further, and because the two cell arrays making up the spacer are disposed at differing elevations—immediately above and below each other—the produced flow resistance at one level of the spacer cells does not have horizontally immediately adjacent cells. Thus, the cells in one layer do not co-act with adjacent flow frictions to the same extent as the co-action would occur if all flow frictions and restrictions were at the same elevation. There results an improved and lesser pressure drop in the disclosed spacer array.

BRIEF DESCRIPTION OF THE DRAWINGS

Other objects, features, and advantages of the disclosed spacer array will become more apparent after referring to the following specification and attached drawings in which.

DESCRIPTION OF THE PREFERRED EMBODIMENT

Figure 1:
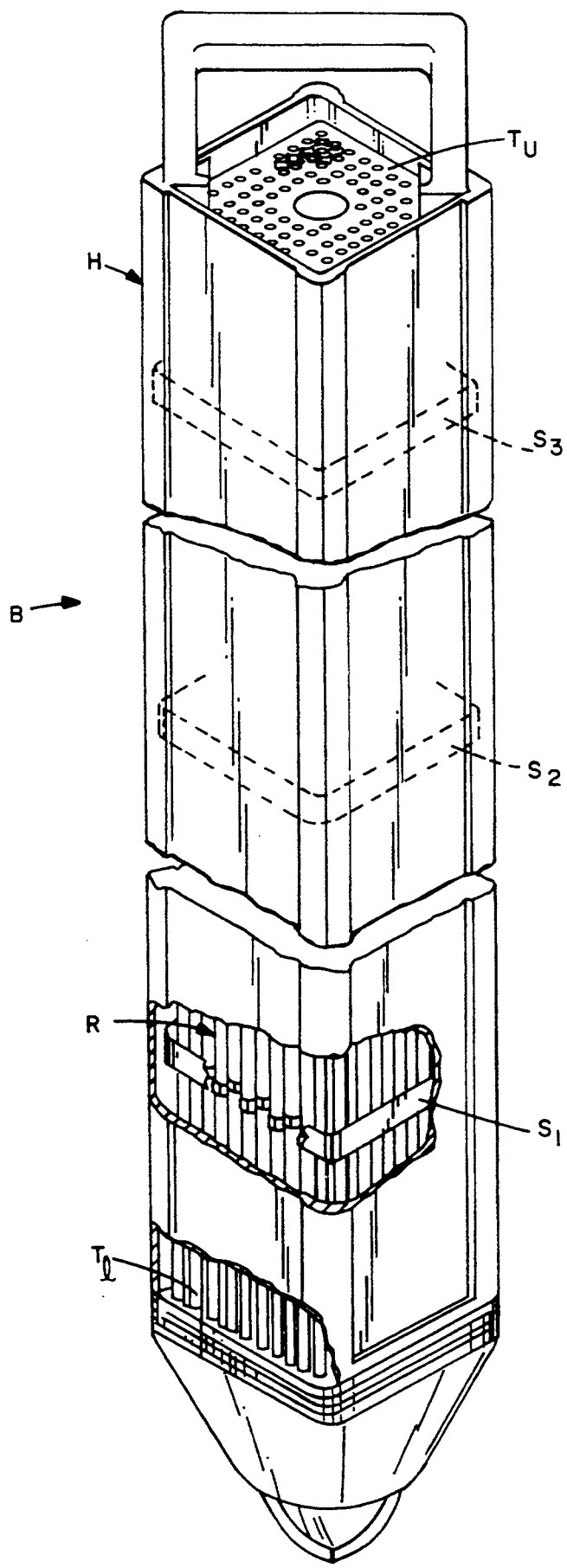
FIG. 1 is a perspective view of a fuel bundle with a portion of the length of the fuel bundle broken away, the remaining vertical section of the fuel bundle illustrating three of the typically six to eight spacers utilized in a fuel bundle.

Referring to FIG. 1, fuel bundle B is shown. It includes lower tie plate $T_1$, upper tie plate $T_u$, and fuel rods R. Fuel rods R are supported on lower tie plate $T_1$ and extend to and toward upper tie plate $T_u$. Channel H is illustrated extending from the vicinity of lower tie plate $T_1$ to the vicinity of upper tie plate $T_u$ so as to define an enclosed flow path between the respective tie plates around fuel rods R.

Spacer $S_1$ is illustrated in a portion of channel H that has been broken away for clarity of understanding. This spacer $S_1$ can better be seen in the perspective view of FIG. 2.

Figure 2:
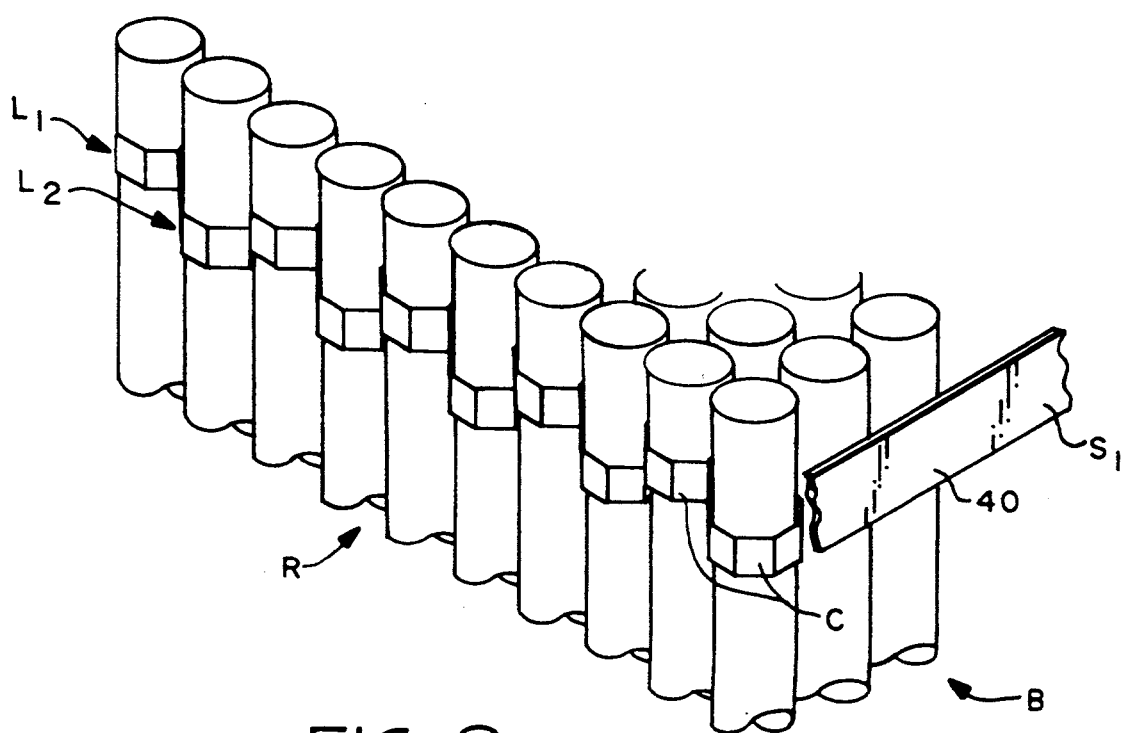
FIG. 2 is an expanded perspective of a spacer according to this invention disposed about the fuel rods within the bundle of FIG. 1.

Referring to FIG. 2, a perspective broken away view of a fuel bundle B having a 10 by 10 fuel rod array is illustrated. Octagonal cells C are shown in an upper layer $L_1$ and a lower layer $L_2$. Some observations can be made about the respective layers $L_1$ and $L_2$.

First, examining layer $L_1$ it will be seen that adjacent cells surround alternating fuel rods R. Thus upper layer $L_1$ has five octagonal cells C in the first, third, fifth, seventh and ninth rod position. Lower layer $L_2$ has five cells C in the first row of the spacer in the second, forth, sixth, eighth, and tenth positions. It will be understood that in the second row upper layer $L_1$ of the spacer —blocked in the view of FIG. 1, the alternation is the second, forth, sixth, eighth, and tenth position. Likewise, in the second row lower layer $L_2$ of the spacer—blocked in the view of FIG. 1—the alternation is the first, third, fifth, seventh, and ninth position. This pattern of alternation continues throughout the disclosed spacer construction. The first layer $L_1$ of the spacer structure is thus void of cells at locations therealong at the first elevation of layer $L_1$ in vertical registration with the cells of the second layer $L_2$ and the second layer of spacer structure is void of cells at locations therealong at the second elevation of layer $L_2$ in vertical registration with the cells of the first layer $L_1$ whereby the cells of the spacer structure alternate between the first and second elevations among the rows and columns of the fuel rods.

Figure 3:
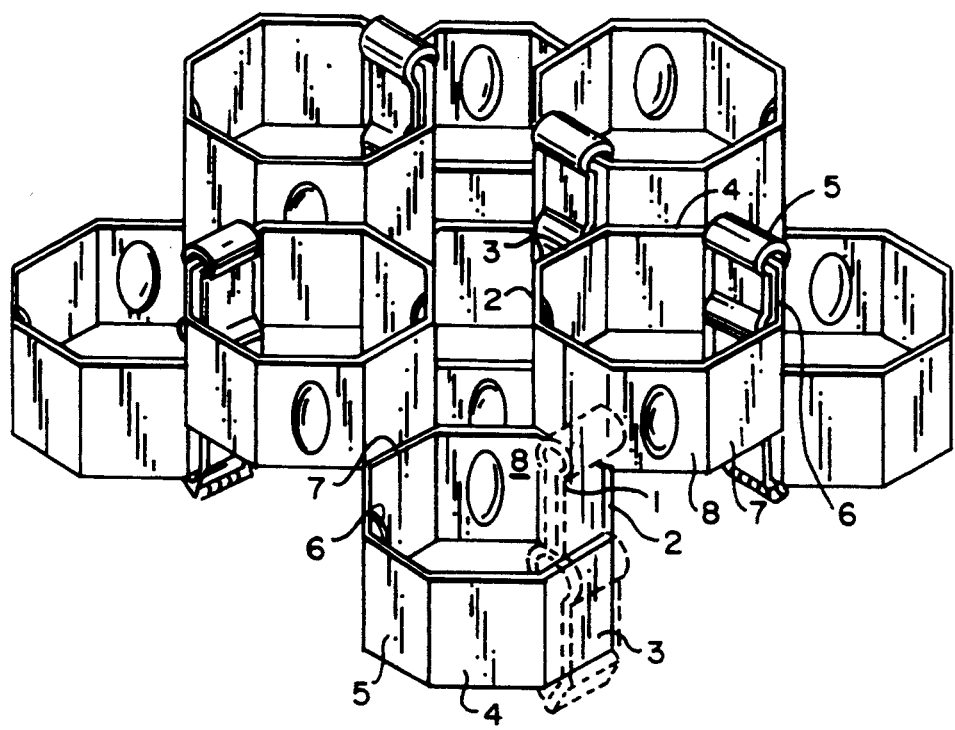
FIG. 3 is a perspective view of nine spacer cells constructed in accordance with this disclosure illustrating the alternate placement of the octagonal spacer cells along each row and column of the fuel rod array and illustrating the respective lower and upper points of attachment of the respective upper and lower cell arrays; this figure also illustrating the attachment of a "hairpin" type spring for biasing fuel rods to a centered position with respect to the spacer cells.

Referring to FIG. 3, a perspective view of nine discrete cells is illustrated, these cells being $C_1$ through $C_9$. Two of the respective cells are supplied with numbers at their respective sides—the sides being respectively numbered 1 through 8.

The reader will understand that the essentially octagonal cells C can be individually made. Typically, these cells C will each include paired stops on two spaced apart walls—such as walls 4 and 6—with a spring biasing a rod R away from wall 1 into a central position shown in broken lines in FIG. 3. Each cell will then be fastened, as by welding, to the corresponding upper or lower adjacent cells. Thus it can be seen in the array of FIG. 3 that walls 1, 3, 5, and 7 extend the full height of layers $L_1$ and $L_2$ while walls 2, 4, 6, and 8 are only half height walls each extending the depth of their particular layer $L_1$ or $L_2$.

Figure 4:
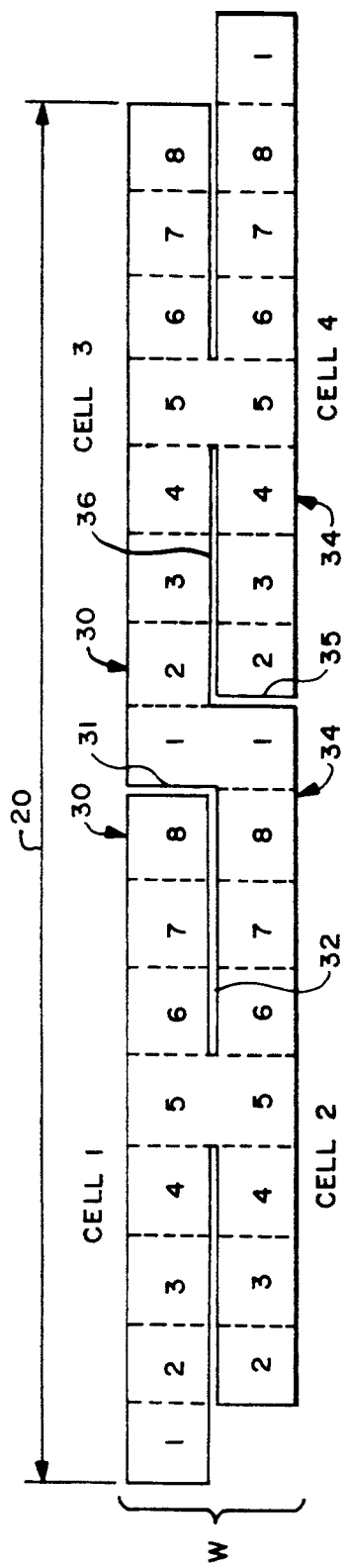
FIG. 4 is a side elevation of strips of sheet metal before bending illustrating boundaries along which such metal may be cut or stamped to form the spacer construction of this invention.
Figure 6:
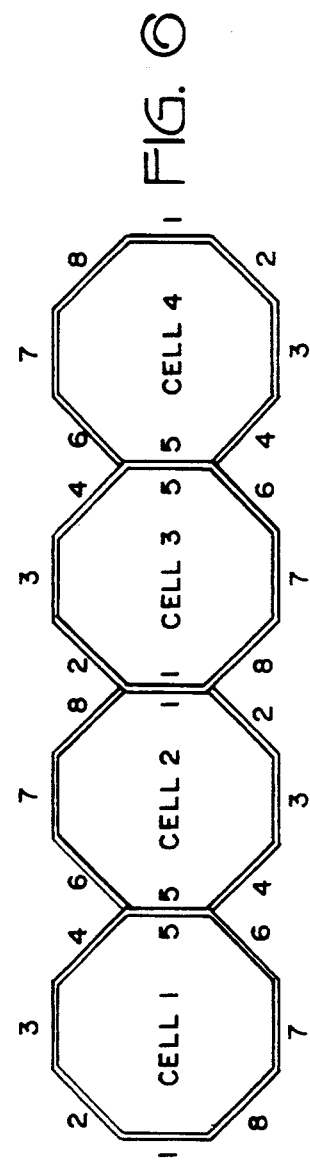
Figure 5:
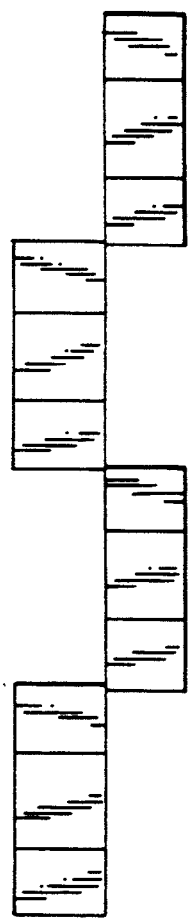
FIG. 5 is a plan view of the metal of FIG. 4 bent into a row of cells in accordance with this invention; and, FIG. 6 is a side elevation of the metal in accordance with this invention.

Having shown a spacer construction which is a combination of individual cells C joined together to make the spacer construction of this invention, a process of construction which enables a row of such alternating spacer cells C to be constructed from a single piece of metal is illustrated in FIGS. 4, 5 and 6.

Referring to FIG. 4, a strip of metal T is shown. This strip of metal has a sufficient length 20 to be bent into four octagonal cells C—two on an upper layer $L_1$ and two on a lower layer $L_2$.

The width W of strip T has the same dimension as the required height of the spacer utilizing both layers $L_1$ and $L_2$.

Once the strip is identified, it is necessary to locate (as by scribing on) upper layer $L_1$ and lower layer $L_2$ opposite sides of said octagonal cells on the strip T. This has been done in the view of FIG. 4. The located opposite sides are sides 1 and 5. As will hereinafter be understood, these sides are important boundaries for the cutting and bending of strip T.

Viewing FIG. 4 further, a cut is made from a side edge 30. This cut 31 extends from a first elongate edge 30 of the strip T along a border of one opposite side, this side being side 1 at cut 31.

Thereafter the cut continues at portion 32 separating strip T centrally in a first direction along the length of three of said octagonal sides 8, 7, and 6 to the border of the other opposite side 5. Cut portion 32 stops at the boundary of side 5.

Viewing FIG. 4 again, a cut 35 is made from opposite side edge 34. This cut 35 extends from a second elongate edge 34 of strip T along a border of opposite side 1, this side being side 1 at cut 35.

Thereafter the cut continues at portion 36 separating strip T centrally in a second and opposite direction along the length of three of said octagonal sides 2, 3, and 4 to the border of said other opposite side 5. This cut portion 36 stops at the boundary of side 5.

Once the respective sides are delimited—as by scribing of the metal at the respective borders of the sides, bending of the separated strip T into a plurality of octagon cells occurs. As seen in the side elevation of FIG. 5, the respective cells alternate in elevation to form the cells C of layer $L_1$ and $L_2$. Further, and with the aid of the plan view of FIG. 6, the respective cells can be identified as to the ultimate destination of the scribed sides.

The reader will understand that the illustration of FIGS. 4, 5, and 6 has shown the formation of four side by side octagonal cells. It will be understood that the respective strips T can be stamped or otherwise formed to be as long as required for the formation of cells in any given row.

Further, and presuming that the cells of the rows are fabricated utilizing the technique here shown, the respective cells will be joined—as by welding—to adjacent rows of cells.

Returning to FIG. 2, it will be realized that a band will typically be placed around the spacer to provide separation between spacer $S_1$ and the inside walls of channel H. Such a band 40 is partially shown in FIG. 2, the remainder of the band being conventional.

The reader will understand that the disclosed invention will admit of modification. For example, the cells could be cylindrical. Likewise, other modifications can be made.

What is claimed is:

1. Cell spacer structure for surrounding discrete nuclear fuel rods arranged in a nuclear fuel bundle matrix within a nuclear fuel bundle channel having walls comprising:

a first layer of said spacer structure including cells for enclosing alternate fuel rods within the rows and columns of the fuel bundle matrix at a first elevation horizontally across said spacer structure;

a second layer of said spacer structure including cells for enclosing the remaining alternate fuel rods within the rows and columns of the fuel bundle matrix at a second elevation horizontally across said spacer structure whereby the cells of said first layer enclose a first fraction of said fuel rods of said matrix and the cells of said second layer enclose the remaining fraction of said fuel rods of said matrix;

the first layer of said spacer structure being void of cells at locations therealong at said first elevation in vertical registration with the cells of the second layer and said second layer of said spacer structure being void of cells at locations therealong at said second elevation in vertical registration with the cells of the first layer whereby the cells of said cell spacer structure alternate between said first and second elevations among the rows and columns of the fuel rods;

means for connecting said first and second layers to form said first and second layers of said cell spacer structure into a unitary structure.

2. Cell spacer structure for surrounding the discrete fuel rods of the fuel bundle matrix according to claim 1 wherein:

each of said cells is octagonal.

3. Cell spacer structure for surrounding the discrete fuel rods of the fuel bundle matrix according to claim 1 wherein:

said rows and columns of fuel rods are normal to the walls of said channel.

4. A fuel bundle for a boiling water nuclear reactor, said fuel bundle comprising in combination:

an array of upstanding nuclear fuel rods;

a lower tie plate for supporting said array of upstanding fuel rods and permitting the entry of water moderator into said fuel bundle;

an upper tie plate for fastening to at least some of said fuel rods and permitting the escape of liquid and generated steam from said fuel bundle;

a fuel bundle channel having walls surrounding said fuel bundle;

a plurality of cell spacers for surrounding the discrete fuel rods of fuel bundles within said fuel bundle channel at discrete elevations;

at least one of said cell spacers including:

a first layer of cells enclosing alternate fuel rods within the rows and columns of the fuel bundle matrix at a first elevation horizontally across said spacer;

a second layer of cells enclosing the remaining alternate fuel rods within the rows and columns of the fuel bundle matrix at a second elevation horizontally across said spacer whereby the cells of said first layer encloses a first fraction of said fuel rods of said matrix at said first elevation of said one spacer and the cells of said second layer encloses the remaining fraction of said fuel rods of said matrix at said second elevation of said one spacer;

said remaining alternate fuel rods at said first elevation and said alternate fuel rods at said second elevation being void of cell spacer structure whereby said cell spacer structure alternates between said first and second elevations of said one spacer among the rows and columns of the fuel rods;

means for connecting said first and second layers to form said first and second layers of said one cell spacer into a unitary structure.

5. The fuel bundle for a boiling water nuclear reactor of claim 4 and wherein:
   each of said cells is octagonal.

6. The fuel bundle for a boiling water nuclear reactor of claim 4 and wherein:
   a plurality of said spacers includes said first and second layers of cells.

7. A method of forming overlying and underlying octagonal rows of spacer cells at first and second adjoining elevations to form a spacer of sufficient vertical height to brace nuclear fuel rods passing through the cells of said spacer, said method comprising the steps of:
   providing an elongate metallic strip having width equal to the vertical height of said spacer and length sufficient for forming at least two octagonal cells for said spacer;
   locating upper and lower opposite sides of said octagonal cells on said strip;
   cutting in from a first elongate edge of said strip along a border of one opposite side;
   separating said strip centrally in a first direction along the length of three of said octagonal sides to the border of said other opposite side;
   cutting in from a second and opposite elongate edge of said strip along the opposite border of the opposite side;
   separating said strip centrally in a second and opposite direction along the length of three of said octagonal sides, said separation being in an opposite direction to said, first separation step; and,
   bending said separated strip into a plurality of octagon cells, with at least one cell at said first elevation and at least one cell at said second elevation for surrounding adjacent said fuel rods at the elevation of said spacer.

8. The method of claim 7 and including the steps of:
joining a first row of cells made by said bending step with a second row of cells made with said bending step.

* * * * *